United States Patent [19]

Seki

[11] 4,212,054
[45] Jul. 8, 1980

[54] DC POWER SOURCE

[75] Inventor: Nagataka Seki, Fuchu, Japan

[73] Assignee: Tokyo Shibaura Denki Kabushiki Kaisha, Tokyo, Japan

[21] Appl. No.: 973,561

[22] Filed: Dec. 27, 1978

[30] Foreign Application Priority Data

Dec. 27, 1977 [JP] Japan ................... 52-156469
Mar. 30, 1978 [JP] Japan ................... 53-37072

[51] Int. Cl.² .......................................... H02M 1/18
[52] U.S. Cl. ........................................ 363/53; 363/126
[58] Field of Search ............... 363/34, 37, 38, 44–48, 363/52–54, 125–129

[56] References Cited

U.S. PATENT DOCUMENTS

| | | | |
|---|---|---|---|
| 3,090,017 | 5/1963 | Novic | 363/47 X |
| 3,612,973 | 10/1971 | Kuniyoshi | 363/34 X |
| 3,986,100 | 10/1976 | Beierholm et al. | 363/37 X |

FOREIGN PATENT DOCUMENTS

42-38216 9/1967 Japan ............................ 363/45
47-45134 11/1972 Japan .
1203763 9/1970 United Kingdom ............. 363/45

Primary Examiner—William M. Shoop
Attorney, Agent, or Firm—Oblon, Fisher, Spivak, McClelland & Maier

[57] ABSTRACT

A DC power source is provided with a rectifier circuit connected to an AC power source and a smoothing circuit, which is comprised of a DC reactor and a parallel capacitor, connected to the output terminal of the rectifier. A load is connected to the parallel capacitor. A diode is connected in a closed circuit including the parallel capacitor and the load, with such a polarity as to check discharging current discharged from the parallel capacitor. The diode forms the closed circuit, together with an auxiliary power source for applying through a reactor to the diode a voltage to make the diode conductive in forward direction. In short-circuiting accident of the load, a conducting circuit established between the auxiliary power source and the diode is shut off to block an excessive current flowing through the diode into a short-circuiting path between the parallel capacitor and the load.

9 Claims, 10 Drawing Figures

DC POWER SOURCE

BACKGROUND OF THE INVENTION

The invention relates to a DC power source with a smoothing circuit comprised of a DC reactor and a parallel capacitor and, more particularly, to a DC power source protected from an excessive current produced in load short-circuiting.

Figure 1:
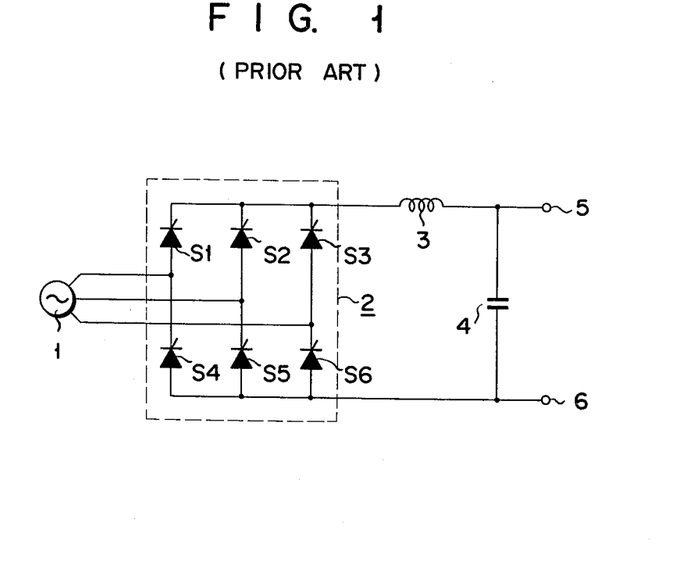
FIG. 1 shows a circuit diagram of a conventional DC power source apparatus.

In a conventional DC power source shown in FIG. 1, an AC output from an AC power source 1 is converted into a DC output by a thryristor rectifier 2 comprising thyristors S1 to S6. Then, the pulsating components in the DC output are filtered out by a smoothing circuit comprising a DC reactor 3 and a parallel capacitor 4 and the smoothed DC output is outputted from terminals 5 and 6. The DC power source unit shown in FIG. 1 is often used in such a manner that the terminals 5 and 6 of the power source unit is coupled with terminals of an inverter 7 comprising main thyristors S7 to S10 and flywheel diodes D1 to D4 thereby feed AC power to a load 10.

In such a case, as a load power factor of the inverter 7 is smaller, the output current of the DC power source apparatus includes more ripple component. It is for this reason that the ripple voltage appearing between the terminals 5 and 6 is reduced by increasing the capacitance of the capacitor 4. For example, an inverter of 100 KVA is coupled with a DC power source of DC 200 V. In this case, about 100,000 F is necessary for the capacitor 4. In the DC power source with such a large capacitor 4, when a commutation failure takes place in the inverter 7, the terminals 5 and 6 shortcircuit the thyristors S7 and S9 or S8 and S10 in the inverter 7 so that an excessive discharging current flows into the shortcircuited thryristors, thus possibly resulting in destruction of the thyristors.

One of the proposals to solve this problem is disclosed in Japanese Publication No. 45134/'72, in which, in the commutation failure in the inverter, the thyristors forming the inverter are all made conductive and thus an excessive current discharging from the capacitor is distributed into a plurality of current paths so that current flowing into a single thyristor is reduced. Another proposal uses a DC fuse between the inverter and the discharging loop thereby to restrict current flowing therethrough.

In the former proposal, there are needs for a reactor for restricting an excessive current from the capacitor into a discharging loop and for a surge absorber for absorbing a spike voltage occurring at the commutation in the reactor. The capacitor provided at the DC output terminal side reduces an impedance at the DC power source side. The provision of the reactor is counter to the end of the use of capacitor. Therefore, it is limited in the increasing value of reactor inductance, so that the restriction of the discharging current is insufficient, for example, in the inductor of approximately 100 KVA, discharging current is large, 30 KA. In the latter proposal, there has not yet been developed a high speed switch adaptable for a very high DC voltage, for example 1.5 to 20 KV. In an ordinary high speed fuse, at least three msec is necessary to complete its shutting off operation, and therefore there is a possibility that it fails to protect the load. In some load, when load shortcircuiting frequently takes place, the power source apparatus must start again immediately after 100 μsec. However, the present fuse can not do such an operation. Anyway, conventional proposals have not fully been successful in overcoming problems caused by an excessive current at an accident.

SUMMARY OF THE INVENTION

Accordingly, an object of the invention is to provide a DC power source apparatus capable of restricting an excessive current caused by an accident such as load shortcircuiting, without deteriorating its normal characteristic.

In order to achieve the just mentioned object, a DC power source apparatus according to the invention is comprised of a DC reactor and a parallel capacitor. A load is connected to the parallel capacitor, and the load and the parallel capacitor constitute a closed circuit. A diode connected in a closed circuit formed by the parallel capacitor and a load, with such a polarity as to check discharging current from the parallel capacitor, an auxiliary power source, which is connected across the diode, for feeding current in forward direction to the diode, and means connected across the diode in which load short-circuiting accident is detected and, upon the detection of the short-circuiting accident, a conducting circuit established between the parallel capacitor and the load is shut off thereby to check an excessive current flowing into a short-circuiting circuit between the parallel capacitor and the load.

With such a construction, the DC power source apparatus according to the invention does not need a reactor for restricting an excessive discharging current in the load short-circuiting or a surge absorber for absorbing a spike voltage in the commutation of the reactor, unlike the conventional DC power source apparatus. Accordingly, at an accident, it permits a swift discharge from the parallel capacitor. Additionally, the DC power source apparatus shuts off an excessive current flowing into a closed circuit formed between the parallel capacitor and by means of the diode.

An auxiliary power source circuit forming a closed circuit together with the diode includes controlled rectifier elements and its conduction is controlled through a gate control. Accordingly, when it is used in a high voltage DC circuit, it is operable at a high speed circuit breaking (several tens μsec) and a high speed closing (several hundreds μsec).

Other objects and features of the invention will be apparent from the following description taken in connection with the accompanying drawings, in which:

DETAILED DESCRIPTION OF THE PREFERRED EMBODIMENTS

Figure 3:
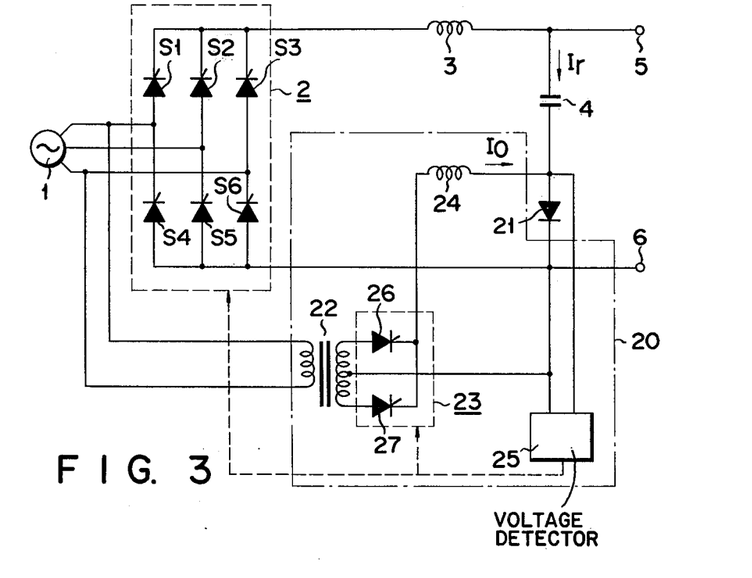
FIG. 3 shows a circuit diagram of an embodiment of a DC power source apparatus according to the invention.

As shown in FIG. 3, a three phase AC output from an AC power source 1 is converted into a DC output by a rectifier 2 comprised of thyristors S1 to S6 and the DC output appears across the output terminals 5 and 6 through a DC reactor 3. The thyristor rectifier 2 and the DC reactor 3 are coupled in parallel with a DC circuit including a capacitor 4 and a diode 21. The diode 21 is connected with such a polarity as to check the shortcircuiting current in the load. Across the diode 21 is connected a rectifier 23 including controlled rectifier elements 26 and 27 for feeding a forward directional current through a reactor 24. The rectifier 23 is coupled with a transformer 22 further connecting to the AC power source 1. A voltage detector 25 for detecting a voltage variation caused by an accident such as load short-circuiting is also connected across the diode 21. Transformer 22, rectifier 23, reactor 24, diode 21 and voltage detector 25 cooperate to form an auxiliary power source 20 which is additionally provided in the conventional power source apparatus shown in FIG. 1.

Figure 2:
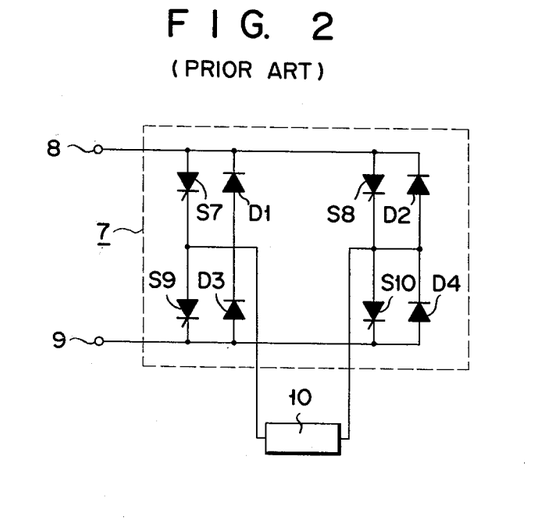
FIG. 2 shows a load circuit diagram including an inverter which is connected to the DC power source apparatus shown in FIG. 1.

In a normal operation of the DC power source apparatus, the sum ripple current Ir of a ripple current generated by the rectifier 2 and another ripple current generated by a load, that is, generated when the inverter 7 shown in FIG. 2 is coupled with the apparatus. When a current Io, where Io is a current flowing from the rectifier 23 into the reactor 24, the anode side of the diode 21 is kept positive and the voltage across the diode is also kept approximately IV. Accordingly, in a normal condition, the DC power source apparatus according to the invention, which has the diode 21 connected in series to the capacitor 4, is operable with about the same characteristic as that of the circuit with only the capacitor 4 connected to the load, as shown in FIG. 1. Under this condition, when an accident such as short-circuiting takes place at the load side, the voltage charged in the capacitor 4 is applied to the diode with such a polarity that the diode is positive at the cathode. Accordingly, the forward current of the diode 21 is blocked to break a closed circuit formed by the capacitor 4, the diode 21 and the load. Therefore, the current flowing into the short-circuited portion in the load circuit is only the sum of the current flowing through the DC reactor 3 and the current Io flowing from the reactor 24 through the capacitor 4. The sum current has a value slightly exceeding the maximum load current in a normal condition, and therefore does not destroy the load, for example, the controlled rectifier elements forming the inverter by no means. Further, with this construction, the voltage applied across the diode 21; at an accident is detached by the voltage detector 25 and the detected output controls the gate firing angles of the controlled rectifier elements 26 and 27 in the rectifier 23 so that it makes the rectifier 23 operate inversely. Therefore, energy in the reactor 3 is regenerated into the AC power source 1 through the thyristor rectifier 2. The energy in the capacitor 4 and the reactor 24 is regenerated into the AC power source 1 through the rectifier 23 and the transformer 22. In this way, the short-circuiting current caused by an accident is damped rapidly.

Although not shown, in order to facilitate the energy regeneration, the rectifier 23 may be replaced by a combination for a low voltage rectifier for the diode 21 and a regenerative rectifier with raised voltage.

Another embodiment of the invention will be described with reference to FIG. 4. The differences of this example from the FIG. 1 examples are: (i) the diode 21 in the auxiliary power source apparatus 20 is connected in the load current path, with such a polarity that the discharging current from the parallel capacitor 4 is blocked, (ii) with this, the polarity of each controlled rectifying element 26 and 27 and the connection of them are changed, and a diode rectifier 28 comprising diodes D1 to D6 is used in place of the thyristor rectifier 2. In the embodiment shown in FIG. 4, the current Io flowing through the reactor 24 is selected to be slightly larger than the maximum load current including ripple current which flows through the load circuit. The excessive current flowing into the load circuit at the load short-circuiting is blocked by the diode 21 so that the current flowing into the short-circuiting portion is limited to the sum of the current flowing through the DC reactor 3 and the current Io flowing into the reactor 24 through the capacitor 4. In this example, however, since the diodes 28 are used the energy in the DC reactor 3 can not be regenerated into the AC power source 1 and thus a circuit breaker 29 is provided between the AC power source 1 and the diode rectifier 28. The breaker 29 is open when the energy is regenerated.

Figure 4:
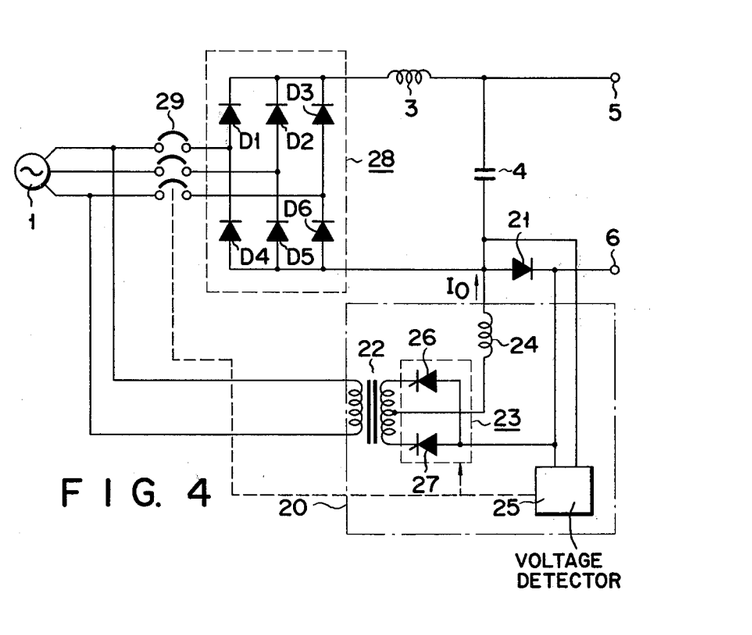
FIGS. 4 to 9 show diagrams of other embodiments of the DC power source apparatus according to the invention.
Figure 5:
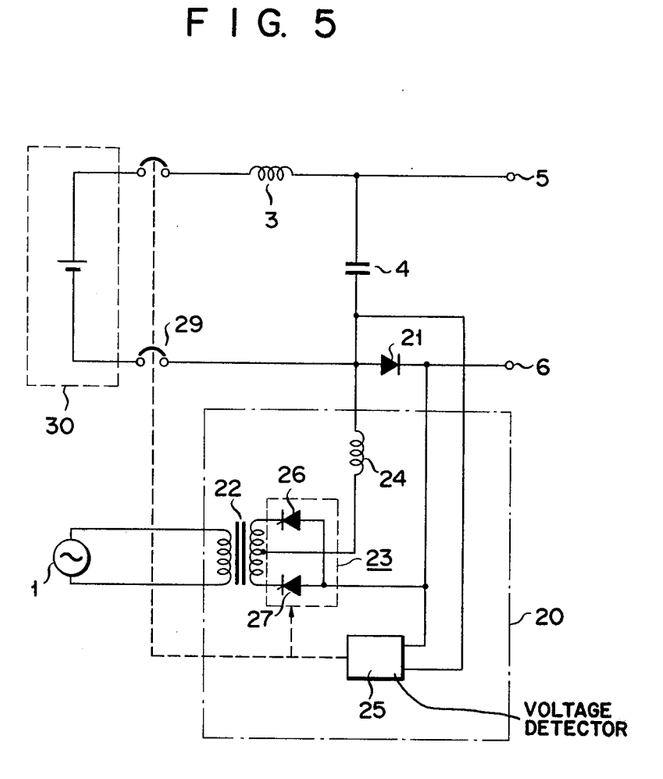

As shown in FIG. 4, an AC power source is connected to the primary winding of the transformer 22. A DC power source 30 may be connected as shown in FIG. 5 to supply DC power to the DC reactor 3 and the parallel capacitor 4 through the circuit breaker 29.

Figure 6:
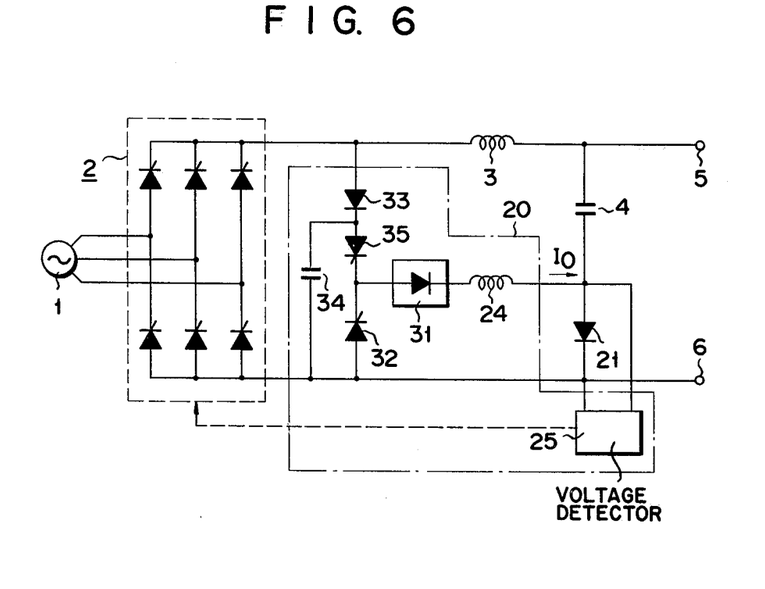

Turning now to FIG. 6, there is shown a third embodiment of the DC power source apparatus according to the invention. A diode 21 is connected in series to the capacitor 4, with such a polarity as to check the short-circuiting current in the closed circuit including the parallel capacitor 4 and a load. In an auxiliary power source apparatus, a thyristor 32, a low voltage DC power source 31 and a reactor 24 are connected in series, with a connection permitting a forward current to pass through diode 21. Another thyristor 35 and a diode 33 are connected in series, being of opposite polarity to the thyristor 32. A series circuit including the diode 33, and thyristors 32 and 35 is connected in parallel with the output terminal of the thyristor rectifier 2. A capacitor 34 intervenes between the thyristor 32 and thyristor 35. A voltage detector 25 connected across the diode 21 is used to detect an inverse voltage at the load short-circuiting.

Figure 7:
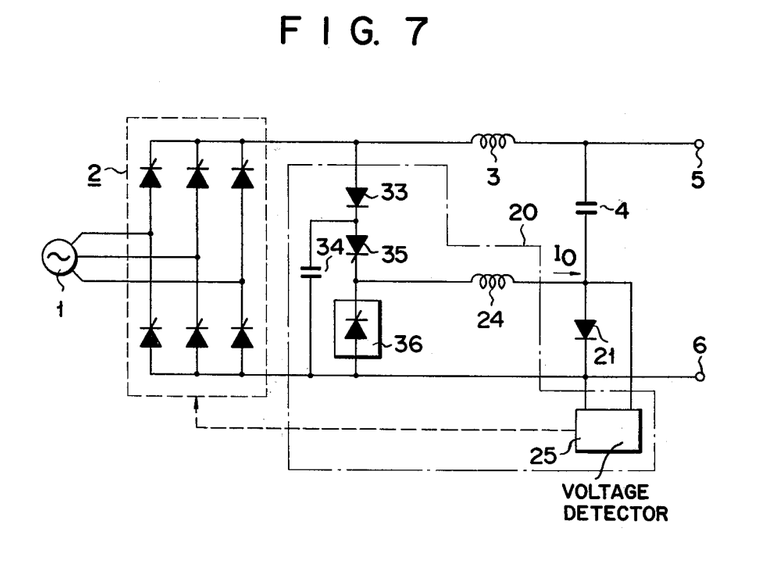

With such a construction, in a normal condition, the DC current Io from the DC power source 31 flows through a closed circuit reactor 24, diode 21 and thyristor 32. The capacitor 34 is charged with the maximum output voltage from the thyristor rectifier 2 via the diode 33. Under this condition, when a load short-circuiting takes place, an inverse voltage across the diode 21 is detected by the voltage detector 25 and the detected voltage fires the thyristor 35. At the same time, it gate-controls the thyristors in the thyristor 2 thereby to operate inversely the thyristor rectifier 2. Upon firing of the thyristor 35, the charged voltage in the capacitor 34 is applied as an inverse voltage to the thyristor 32 so that the thyristor 32 is turned off. As a result, an excessive current caused by the load short-circuiting is shut off by the diode 21 and no excessive current flows into the closed circuit comprising the capacitor 4 and the load. At the same time, the energy in the reactor 24 and the capacitor 4 is regenerated into the power source side, through a route, power source 1—thyristor rectifier 2 —diode 33—thyristor 35—DC power source 31—reactor 24—capacitor 4—short-circuiting circuit—thryristor rectifier 2—power source 1. At this time, the energy in the DC reactor 3 also is regenerated into the AC power source 1, through the thyristor rectifier 2. FIG. 7 shows a fourth embodiment of the DC power source according to the invention. As shown, the DC power source 31 and the thyristor 32 in FIG. 6 are substituted by a DC power source 36 using a thyristor with a polarity as shown. The DC power source 36 forms a closed circuit, together with the reactor 24 and the diode 21. Like numerals are used to designate like portions in FIG. 5 and the explanation thereof is omitted. Also in FIG. 7, in a normal condition, the DC current Io from the DC power source 36 forwardly flows through the diode 21 through the reactor 24 and the DC output is applied to a load circuit coupled between terminals 5 and 6. An excessive current at the load short-circuiting is blocked by the diode 21 and the inverse voltage across the diode is detected by the voltage detector 25. The detected output fires the thyristor 35 so that the DC current from the DC power source 36 is blocked by the charged voltage in the capacitor 34. The energy in the reactor 24, the capacitor and the DC reactor 3 are similarly regenerated into the AC power source 1. The restriction function of excessive current at the load short-circuiting has been described in the above-mentioned embodiments. However, at the power stoppage, the load side may forcibly be short-circuited to regenerate the energy stored in the capacitor into the power source side.

Figure 8:
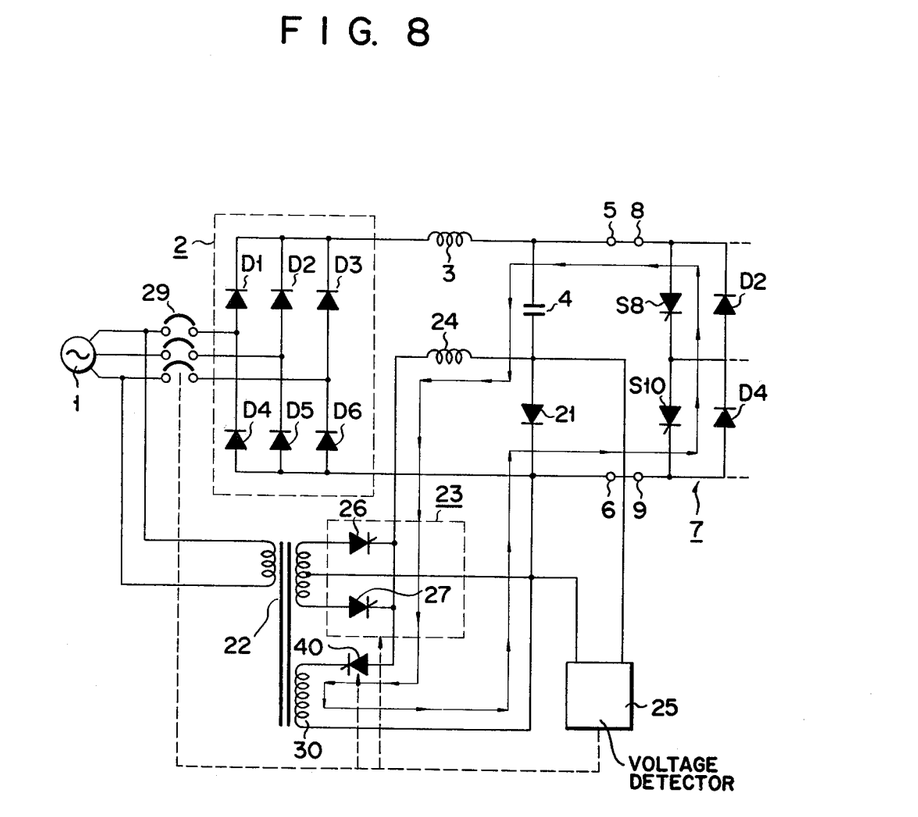

In the embodiments shown in FIGS. 3, 5, 6 and 7, where the DC power source is not the thyristor rectifier but the diode rectifier as shown in the case of FIG. 4 or a battery, if the DC voltage is directly applied to both sides of the capacitor, the capacitor is rapidly charged. For this, the capacitor is excessively charged or shortened in life time, and unnecessary surge current flows into an input circuit breaker or the diode rectifier. A proposal to avoid such problems is illustrated in FIG. 8. As shown, a new winding 30 is connected to the secondary winding of the transformer 22 and to the capacitor 4 through the thyristor 40 and the reactor 24. When the inverter as shown in FIG. 7 is coupled as a load with the terminals 5 and 6, a close circuit, diodes D4 and D2 of the inverter 7—capacitor C4—reactor 24—the secondary winding 40 of transformer 22, is closed so that the capacitor 4 is preliminarily charged.

A still further embodiment of the DC power source apparatus will be described referring to FIG. 9. The circuit constructions of the DC output source and the load circuit are the same as those mentioned above and thus explanation thereof will be omitted. In the closed circuit including the capacitor 4 and the load 7, a diode 80 is provided with opposite polarity to the direction of the load current $I_L$. In this embodiment, the diode is included and an auxiliary power source 20 with current restriction and circuit breaking functions is provided. In the auxiliary power source 20, AC current fed through a circuit breaker 81 and an insulating transformer 82 is converted into DC current by the thyristor rectifier 83. A closed circuit, which is connected to the thyristor rectifier 83, is comprised of diode 80, GTO thyristor 84, and reactor 85 and feeds a forward current to the diode 80. A thyristor 86 is connected across the reactor 85, with a polarity to check the current Ic. The current Ic from the thyristor rectifier 83 is selected to be larger than the load current $I_L$, i.e. $Ic < I_L$ and, under this condition, the current Ic is forwardly fed to the diode 80. In this case, the voltage across the diode is in the order of 1 V and the load current $I_L$ from the main DC power source flows into the load circuit.

Under this condition, when load short-circuiting takes place, the load current increases to exceed the forward current Ic flowing through the diode 80 and thus the relation $I_L > I_c$ is established. At this time, the voltage detector 25 detects the inverse voltage between both terminals of the diode 80 so that the abnormality in the load circuit is detected. The detected output turns off the GTO thyristor 84 to shut off the current path which includes diode 80, GTO thyristor 84 and reactor 85 and permits the DC current Ic from the thyristor rectifier 83 to pass therethrough. As a result, the current Io becomes zero and the load current $I_L$ is blocked by the diode 80 and therefore is immediately reduced to zero. At this time, the current having flowed through the reactor 85 circulates in the closed circuit including the thyristor 86 and the reactor 85, upon application of an on pulse to the thyristor 86. Accordingly, the reactor 86 does not produce an excessive current by no means. When the load current $I_L$ is restored to a normal state, an on pulse is again applied to the thyristor 84 to make the thyristor conductive, so that an inverse voltage is applied to the thyristor 86 currently being conductive to immediately be turned off. Accordingly, the closed circuit including thyristor rectifier 83, diode 80, GTO thyristor 84 and reactor 85 restores again to the conductive state so that the load current $I_L$ flowing from the DC power source to the load circuit can maintain its normal conductive state.

Figure 9:
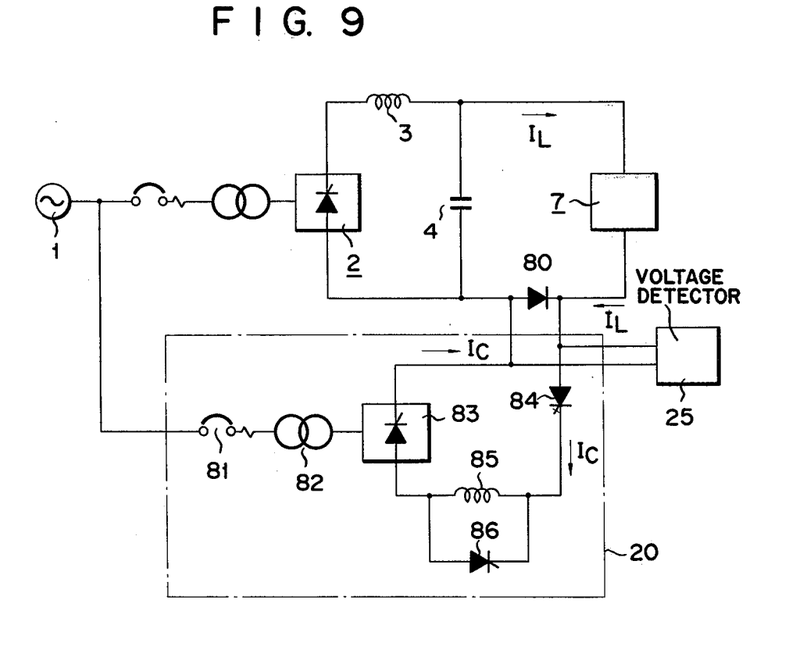
Figure 10:
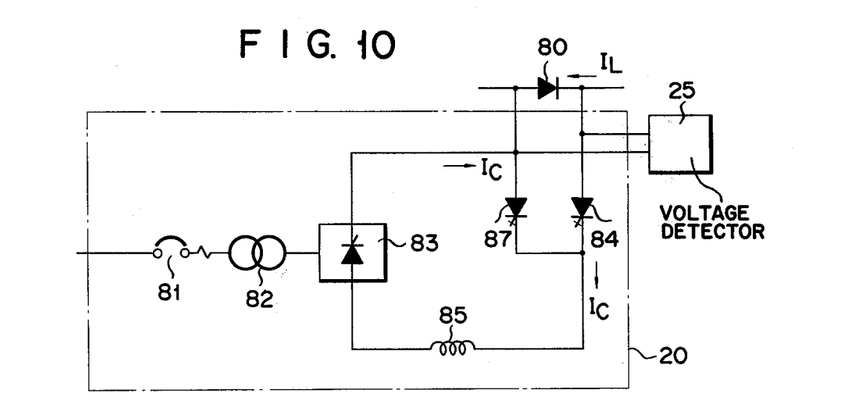
FIG. 10 shows a circuit diagram of another example of the auxiliary power source circuit shown in FIG. 9.

FIG. 10 shows a modification of the auxiliary power source 20 in FIG. 9. As shown, in this example, the thyristor 86 connected in parallel with the reactor 85 in FIG. 9 is omitted and a GTO thyristor 87 with the polarity as shown is connected between the anode electrode of the diode 80 and the cathode electrode of the GTO thyristor 84. With such a circuit connection, in a normal condition of the load circuit, the DC current Ic from the thyristor rectifier 83 circulates in the order of diode 80, GTO thyristor 84 and reactor 85. In the short-circuiting accident of the load circuit, an inverse voltage across the diode 80 is detected by the voltage detector 25 and an on pulse is applied to the GTO thyristor 84. At the same time, an on pulse is applied to the GTO thyristor 87 thereby to form a closed circuit together with the thyristor rectifier 83 and the reactor 85. With the circuit connection, the short-circuiting current $I_L$ is shut off by the diode 80 and the DC current Ic from the thyristor rectifier 83 circulates through the GTO thyristor 87 and the reactor 85. In this example, when the load current $I_L$ is fed again, the gate control is so performed that the GTO thyristor 87 is turned off and the thyristor 84 is turned on. If so gate controlled, the DC current Ic continues its flow when the load current $I_L$ is shut off, so that the load current $I_L$ rises more rapidly than that in the example in FIG. 9.

Several to several tens volts suffices for the DC output voltage of the auxiliary DC power source and is approximately 1/100 and 1/1000 of the main DC power source. Accordingly, from a voltage withstanding view, there is no problem in protection of diode 80 and GTO thyristors 84, 86 and 87.

What is claimed is:

1. A DC power source apparatus including a DC reactor, a parallel capacitor, a load circuit connected to the parallel capacitor, comprising:

a diode which is connected in a closed circuit formed by the parallel capacitor and the load circuit, with such a polarity as to block discharge current from the parallel capacitor; and an auxiliary power source which is connected across the diode and feeds a forward current when the load circuit is in a normal condition and makes the DC output of the DC power source flow into the load circuit, and which further includes a voltage detector connected to the closed circuit formed by the parallel capacitor, the load circuit and the diode, thereby detecting an abnormal condition of the load circuit and shutting off the load current flowing in said diode on the basis of the detected output.

2. A DC power source apparatus according to claim 1, wherein said auxiliary power source includes a thyristor rectifier coupled to an AC power source, a reactor forming a closed circuit together with the thyristor rectifier and the diode, and a voltage detector which is connected across said diode and detects an inverse voltage across the diode.

3. A DC power source apparatus according to claim 1, wherein said diode is connected in series to said parallel capacitor and the load circuit is connected to the DC output terminal of said smoothing circuit coupled with said diode.

4. A DC power source apparatus according to claim 1, wherein said diode is connected in a load circuit connected to the DC output terminal of said smoothing circuit.

5. A DC power source apparatus according to claim 4, in which the firing control angles of the thyristors in said thyristor rectifier are so controlled that the energy in the series reactor of said smoothing circuit and in the reactor of said auxiliary power source is regenerated into the AC power source in response to the detected output from said voltage detector for detecting an inverse voltage across said diode caused by a short-circuiting accident of the load circuit.

6. A DC power source apparatus according to claim 1, wherein said auxiliary power source comprises a series circuit which is coupled between the output terminals of said rectifier and is comprised of a diode and a first thyristor, these being connected with a forward polarity, and a second thyristor connected with an opposite polarity to the first thyristor, a series circuit which is connected between the cathode of said second thyristor and the anode of said diode, and is comprised of a DC power source and a reactor, forming a circulating circuit between said second thyristor and said diode, a capacitor connected at both sides to the anodes of said first and second thyristors, and a voltage detector which is connected across said diode and detects an inverse voltage across said diode to regenerate the energy in the reactor in said AC power source on the basis of the detected output.

7. A DC power source apparatus according to claim 1, wherein said auxiliary power source is comprised of a series circuit which is connected between the output terminals of said rectifier, said series circuit comprising a DC power source including a diode and a first thyristor, these being connected with a forward polarity, and a thyristor connected with an opposite polarity to the first thyristor, a reactor which is connected between a load of the DC power source including thyristors to form a circulating circuit between the DC power source including said thyristors and said diode, a capacitor correspondingly connected at both ends to the anode of said first thyristor and the positive terminal of the DC power source including the thyristors, and a voltage detector which is connected between both terminals of said diode to detect an inverse voltage across said diode and to regenerate the energy in said reactor into said AC power source on the basis of the detected output.

8. A DC power source apparatus according to claim 1, wherein said auxiliary power source comprises a thyristor rectifier connected to an AC power source and producing a DC output, a series circuit which is connected between the cathode of said diode and the anode of said thyristor rectifier, said series circuit including a GTO thyristor and a reactor connecting between the cathode of said GTO thyristor and the anode of said thyristor rectifier thereby to form a circulating circuit together with said thyristor rectifier and said diode, a thyristor connected across said reactor, and a voltage detector which is connected between both electrodes of said diode to detect an inverse voltage across said diode and to control a circulating current in said circulating circuit on the basis of the detected output thereby to shut off a load current flow by said diode.

9. A DC power source apparatus according to claim 1, wherein said auxiliary power source is comprised of a rectifier which is connected to an AC power source and produces a DC output, a series circuit connected between the cathode of said diode and the anode of said thyristor, said series circuit comprising a first GTO thyristor connected to the cathode of said diode, and a reactor connected between the cathode of said first GTO thyristor and the anode of said thyristor rectifier thereby to form a circulating circuit including said thyristor rectifier and said diode, a second GTO thyristor connected between the cathode of said first GTO thyristor and said second GTO thyristor, and a voltage detector which is connected between both terminals of said diode to detect an inverse voltage across said diode and to control a circulating current in said circulating circuit on the basis of the detected voltage thereby to shut off a load current flow by said diode.

* * * * *